United States Patent [19]

Sams

[11] Patent Number: 5,020,699
[45] Date of Patent: Jun. 4, 1991

[54] DISPENSING CONTAINERS

[75] Inventor: Bernard Sams, London, England

[73] Assignee: Lever Brothers Company, Division of Conopco, Inc., New York, N.Y.

[21] Appl. No.: 30,203

[22] Filed: Mar. 25, 1987

[30] Foreign Application Priority Data

Mar. 27, 1986 [GB] United Kingdom ............... 8607780
Nov. 6, 1986 [GB] United Kingdom ............... 8626559

[51] Int. Cl.$^5$ .......................................... G01F 11/28
[52] U.S. Cl. .................................. 222/450; 222/442; 222/443; 222/452; 222/454; 222/109; 222/111; 222/483
[58] Field of Search ............... 222/452, 454, 455, 456, 222/450, 396, 397, 484, 111, 42, 48, 158, 425, 483, 443, 109, 108, 110; 215/313, 311

[56] References Cited

U.S. PATENT DOCUMENTS

| Re. 24,159 | 5/1956 | Livingstone | 222/111 |
|---|---|---|---|
| 1,687,705 | 10/1928 | Androff . | |
| 1,949,130 | 2/1934 | Renfro . | |
| 2,038,418 | 4/1936 | Conner | 222/454 |
| 2,530,012 | 11/1950 | Gronemeyer | 222/454 |
| 2,760,693 | 8/1956 | Mika | 222/454 |
| 3,005,578 | 10/1961 | Mainieri | 222/450 |
| 3,006,506 | 10/1961 | Germano | 222/49 |
| 3,129,859 | 4/1964 | Chappell | 222/456 |
| 3,184,782 | 5/1965 | Armour | 215/313 X |
| 3,402,860 | 9/1968 | Torongo, Jr. | 222/207 |
| 3,414,172 | 12/1968 | Souza | 222/456 X |
| 3,424,355 | 1/1969 | Blumen | 222/450 |
| 4,214,679 | 7/1980 | Whang | 222/158 |
| 4,646,947 | 3/1987 | Stull | 222/397 |

FOREIGN PATENT DOCUMENTS

| 0202406 | 11/1986 | European Pat. Off. . | |
|---|---|---|---|
| 488095 | 8/1927 | Fed. Rep. of Germany . | |
| 2347092 | 3/1975 | Fed. Rep. of Germany | 222/452 |
| 3133835 | 3/1983 | Fed. Rep. of Germany . | |
| 3417001 | 11/1985 | Fed. Rep. of Germany . | |
| 1416 | of 1869 | United Kingdom | 215/313 |
| 36 | of 1890 | United Kingdom | 215/313 |
| 1224927 | 3/1971 | United Kingdom . | |
| 2093804 | 9/1982 | United Kingdom . | |
| 2133774 | 8/1984 | United Kingdom . | |

Primary Examiner—Kevin P. Shaver
Attorney, Agent, or Firm—G. J. McGowan, Jr.

[57] ABSTRACT

Dispensing containers are described in which a metering chamber for the contents of a fluid container is mounted in the neck of the container. Openings intermediate the height of the chamber allow it to be put in communication with the container interior by a rotary movement, e.g. applied to an external closure cap. When the closure cap is rotated to open the chamber to the container interior it also adopts a sealing position preventing the escape of any of the contents. The space in the chamber above the apertures is greater than that below. Sufficient fluid can be admitted to the chamber by inverting the container, therefore, to ensure that the lower space is completely filled when the container is again turned upright. Reverse rotation closes the openings to isolate the metered fluid from the main volume of the container and can also open the chamber to the exterior to allow the metered quantity to be dispensed.

19 Claims, 6 Drawing Sheets

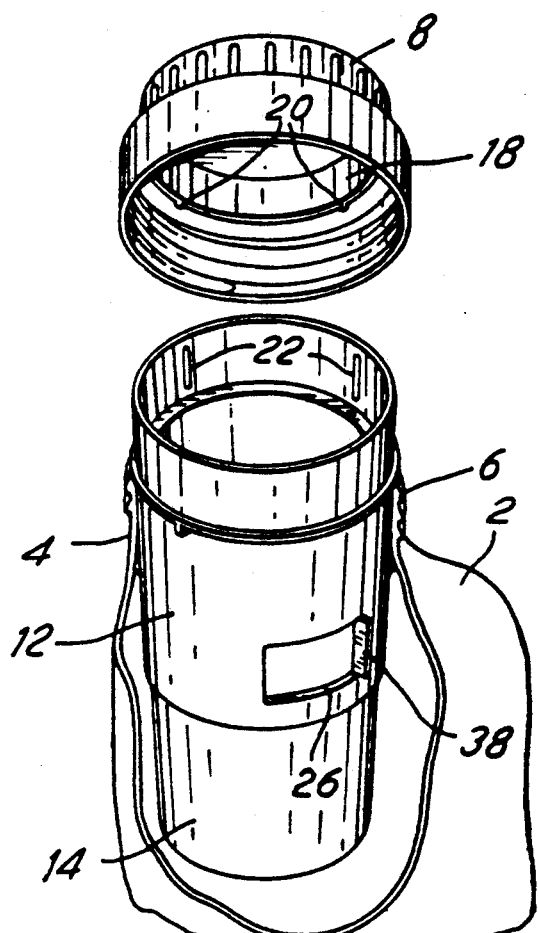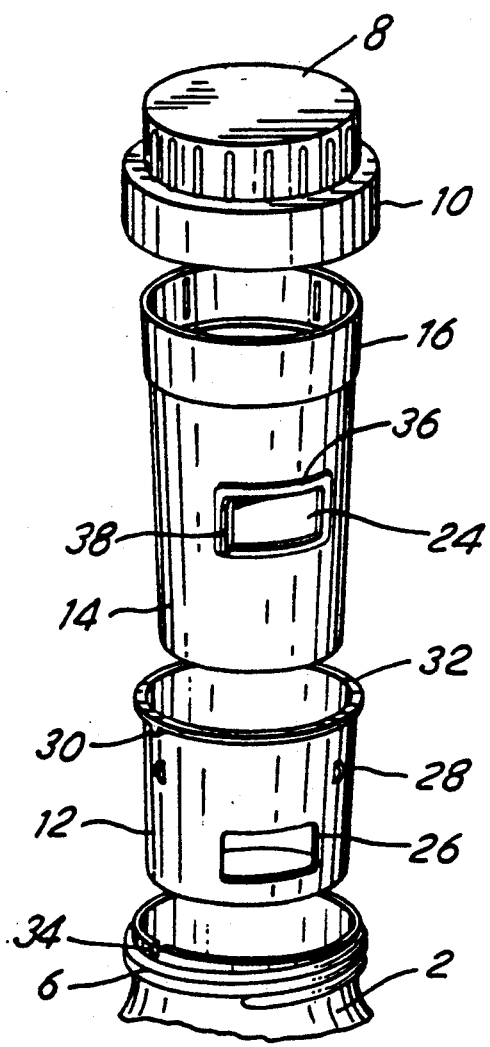

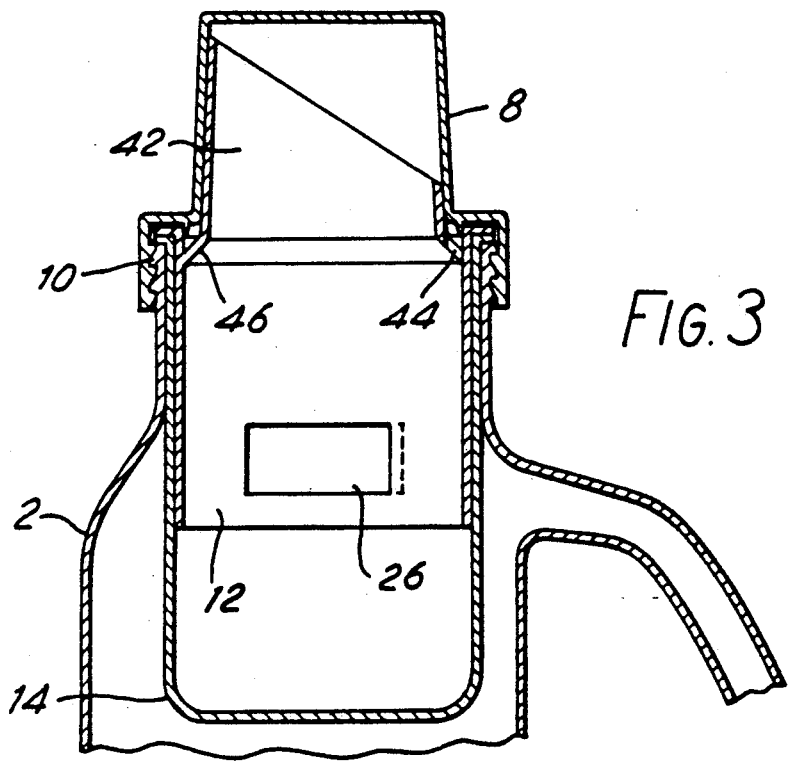
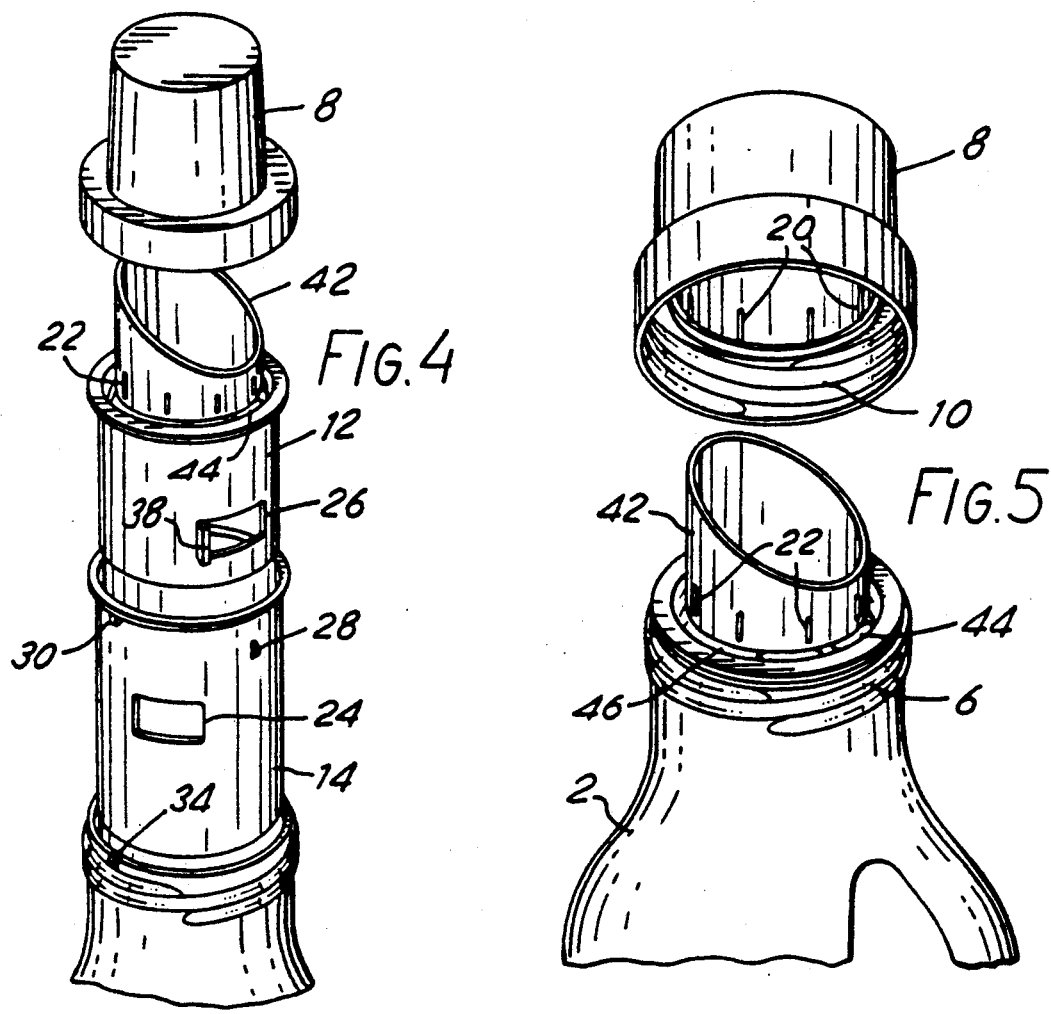

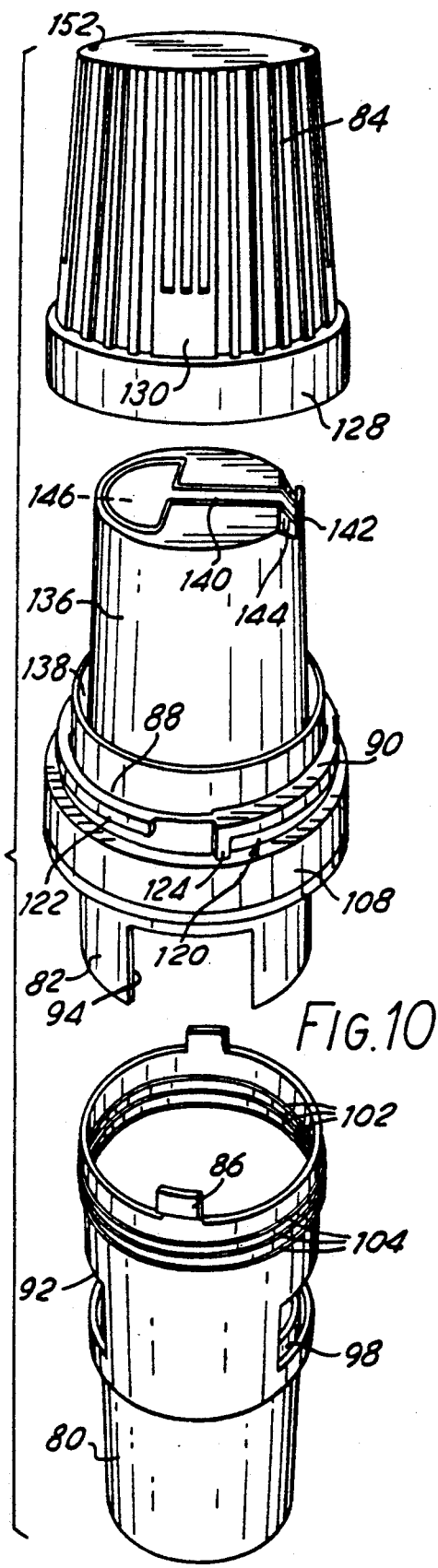
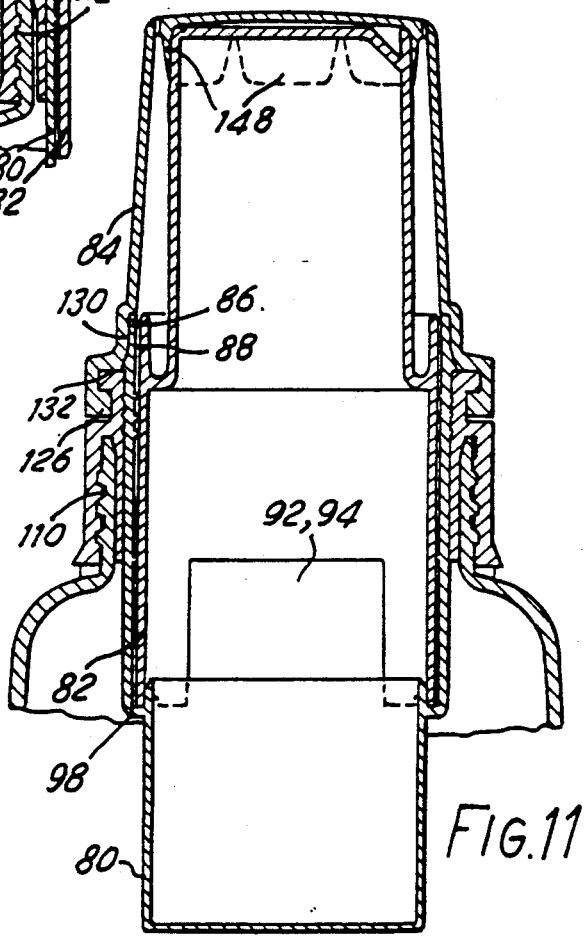
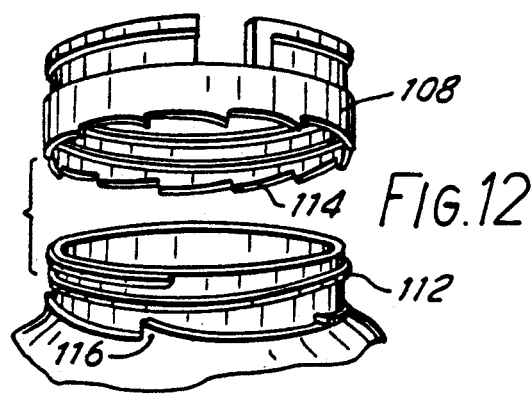

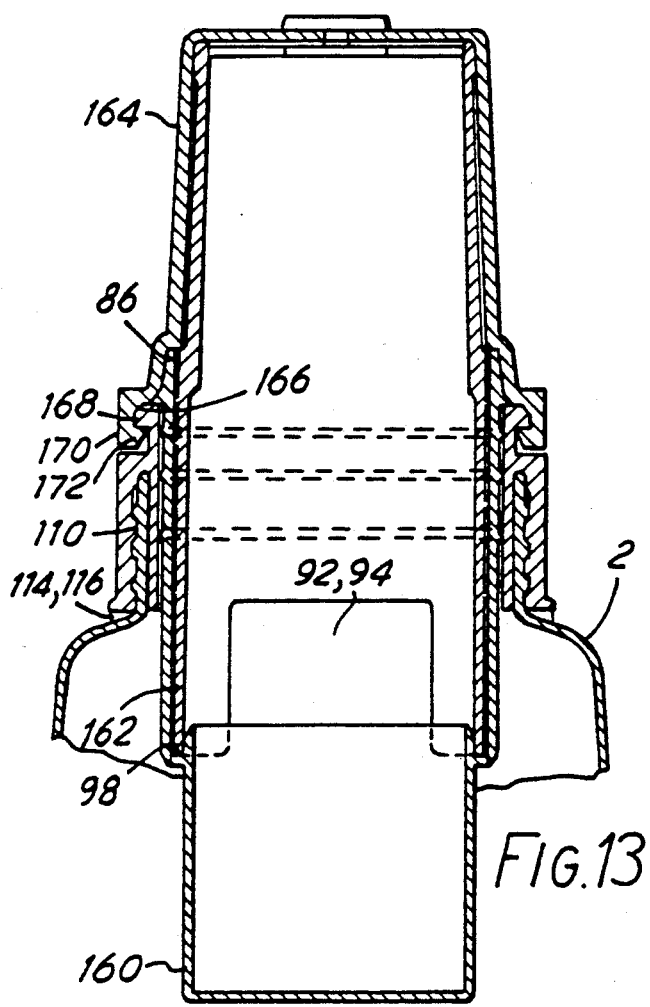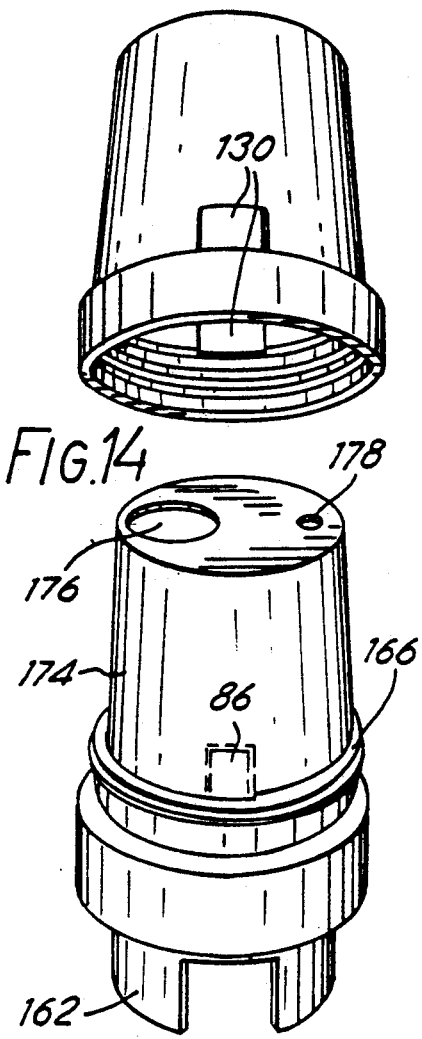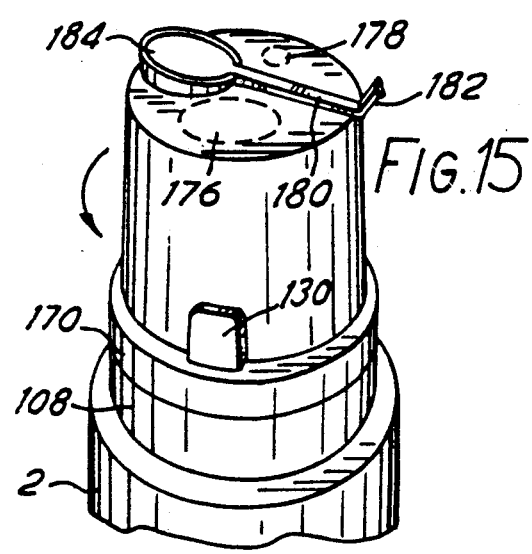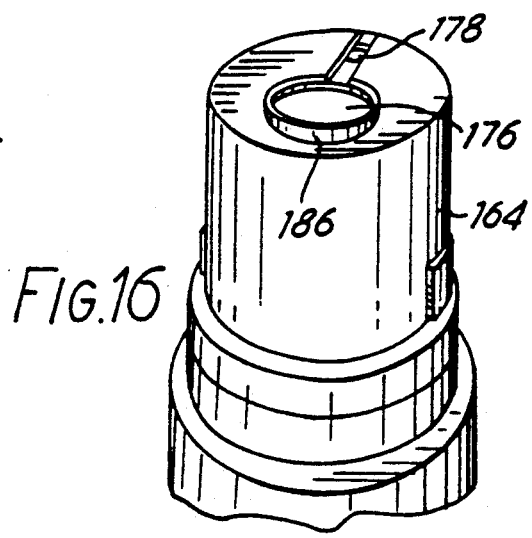

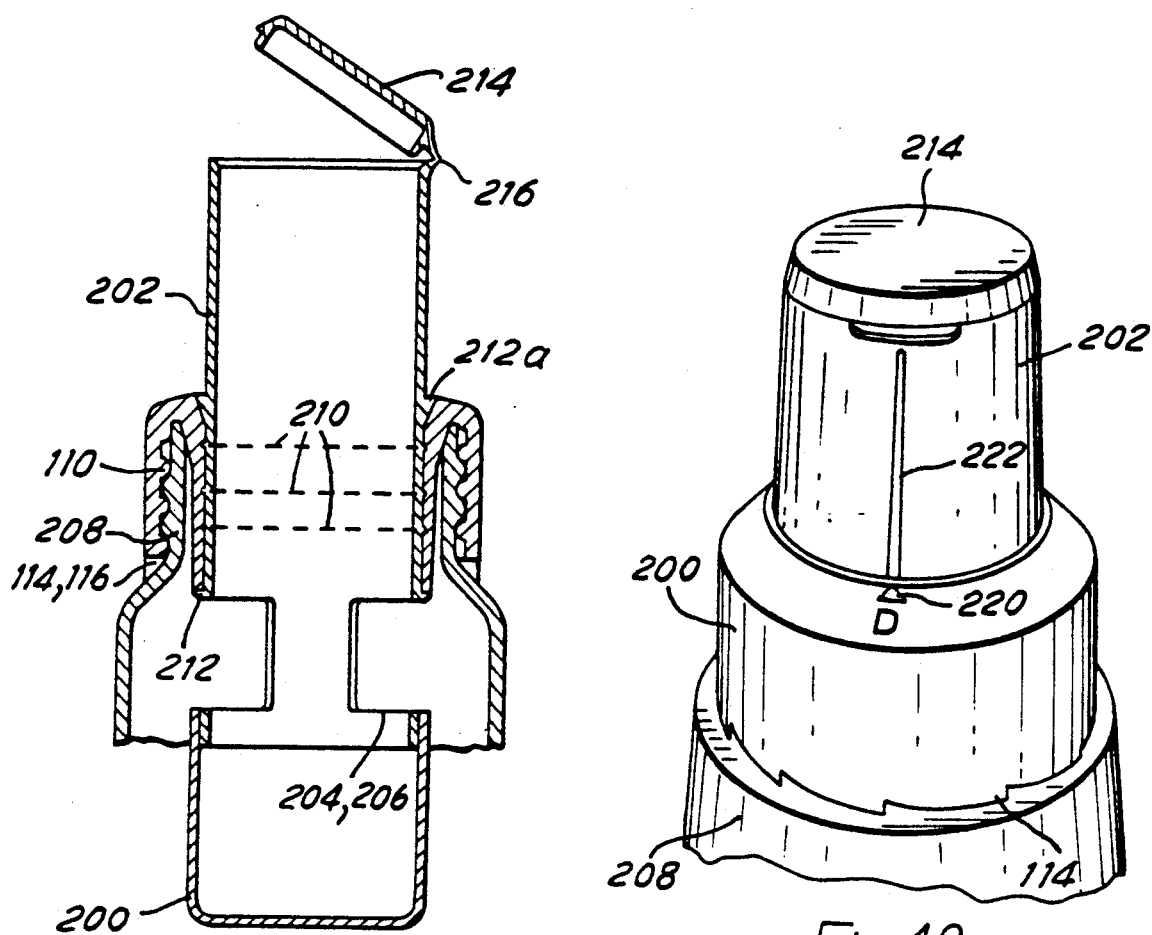
FIG.17
FIG.18
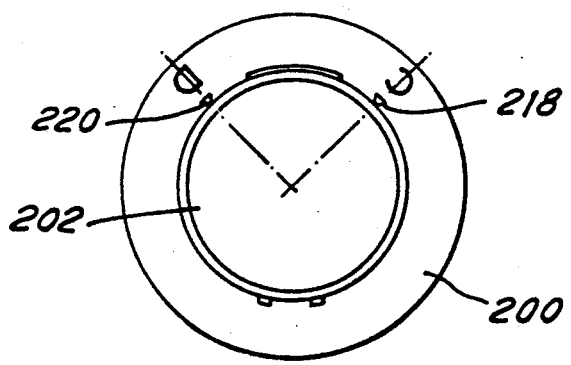
FIG.19

DISPENSING CONTAINERS

FIELD OF THE INVENTION

This invention relates to fluid containers that are provided with means for dispensing the contents in predetermined quantities.

BACKGROUND OF THE INVENTION

There exists a need for a relatively economical form of metering dispenser that can be used with a variety of fluids and that can be permanently located or incorporated in the fluid container but that also allows the container to be provided with a positive means of closure, e.g to protect against accidental spillage. Dispensers in the form of optics are known that incorporate a non-return valve but these are relatively expensive in construction and would be uneconomic to incorporate them in containers that are intended to be disposed of when the contents have been consumed.

Simpler metering dispensers are known but they suffer of disadvantages. In GB 1224927 and U.S. Pat. No. 3005578 there is provided a metering chamber which is filled by inverting the container, but the container must then be held inverted while the user rotates the metering device to seal the chamber off from the main body of the fluid, which can be an extremely inconvenient operation, especially with larger containers. U.S. Pat. No. 3006506 has a similar arrangement, but with a permanently inverted container, which therefore has only a very limited application. DE 3133835 describes a metering device which requires the container to be held inverted and, even more inconveniently a plunger of the device must be pushed upwards while the container is held there.

In GB 2133774, when the container is inverted a metering chamber is filled by a tube that extends to the bottom of the container and is in permanent communication with the chamber, but it is then possible to dispense an excess quantity if more fluid is allowed to travel through the tube into the chamber when the container is tipped to dispense the fluid in the chamber. There are also known dispensing containers which generally do not permit a given volume of liquid to be automatically measured but require manipulation by the user to control the quantity being dispensed - as exemplified by GB 2093804 and U.S. Pat. No. 4214679.

In U.S. Pat. No. 3402860, metering dispensers are described which require the container to be squeezed to force the fluid into a metering chamber against the pressure of the air in the chamber. Repeated squeezing is needed to bring the liquid to the required level in the chamber as air must be allowed to escape from the chamber between squeezes. This introduces a source of error as it cannot be expected that the general user will always squeeze sufficiently hard and often to meter the intended quantity, but in addition the main volume of the container remains in communication with the metering chamber when the dose is dispensed and, as is admitted in U.S. Pat. No. 3402860, this is a source of potential inaccuracy that can only be minimized by the user observing a strict procedure.

Finally there can be mentioned DE 3417001 which describes a metering mechanism intended to prevent overdosing. To this end, a metering cup is axially slidable in the neck of a container to open and close connecting apertures between it and the main volume of the container. The apertures are disposed intermediate the height of a metering chamber and the dose metered by inverting the container to fill the normally uppermost region and then returning the container to the upright position. The cup is engaged by a screw closure cap which draw the cup up to close the apertures as the cap is removed, and the metered dose is hen dispensed. It is difficult, however, to produce such an arrangement that is easy to use and yet not prone to leakage: the axial engagement and disengagement of the cap with the cup requires some force as an interference fit is involved, which can make it difficult for use by the aged and infirm. If the cup is designed so as to slide too easily, not only is it difficult to seal the closure adequately but the position of the cup is easily disturbed if the container is shaken when tipped, which can resulting the apertures reopening and allowing excess fluid to pour through. Moreover, DE 3417001 proposes, for precise dosing, that the metering chamber space above the apertures should correspond to the space below the apertures but such an arrangement is prone to inaccuracy, firstly because it relies on the ability to locate the cap at a precise and repeatable axial position each time the metering mechanism is used, and further because it makes no allowance for the unskilled, domestic user who may allow some of the contents to spill back from the metering chamber when turning the container upright again and may affect the volume of the upper space by screwing the cap on more or less loosely.

SUMMARY OF THE INVENTION

According to one aspect of the present invention, there is provided a fluid container comprising an upper outlet provided with external closure means and having metering means comprising a chamber between said closure means and the volume of the container for dispensing a measured quantity of fluid, the chamber being provided with at least one aperture intermediate its height that is able to give communication between its interior and the main volume of the container, the aperture being opened and closed by a rotary movement, the chamber providing upper and lower receiving spaces that are respectively above and below said aperture, whereby inversion of the container with the aperture open and the closure means closed fills the upper space with the container contents and return to the upright position allows the contents of the upper space to fall into and fill the lower space, whereafter, by reverse rotation the aperture is closed to permit the metered contents of the lower space to be dispensed.

The invention permits the dispensing of the container contents in doses without the risk of any additional fluid escaping when the metered quantity is dispensed. This means for achieving this result can be incorporated in a container simply and economically, so that it is practical to provide such means as an integral part of the container that can be disposed of when the contents have been used.

It is preferred to arrange that the volume of said upper space of the chamber is greater than the volume of the lower space. Such a measure has the advantage of making it easier to dispense a consistent quantity of fluid in a simple manner, requiring no skill on the part of the user.

Preferably, said aperture is arranged to be opened and closed by rotation of the closure means. Such an arrangement is particularly suitable if it is intended that the container contents are only to be dispensed in metered quantities but it is also possible within the scope of the invention to provide a form of dispensing means that are adjustable to permit continuous unmetered dispensing of the container contents.

In one form of the invention the chamber may be formed by a circular cross-section receptacle that has an associated sealing member, also of circular cross-section closely fitting it, respective openings in the receptacle and sleeve-like sealing member being registerable by a relative rotational movement to form the aperture giving communication between the receptacle interior and the main body of the container. The receptacle itself or the sealing member may be fixed relative to the container.

It is possible, alternatively to locate a receptacle having at least one opening in its side wall in a neck region of the container, in which neck region there is at lest one arcuate portion disposed at the level of said at least one receptacle opening to seal said opening, as said sealing element while a further portion of said region at the same level is radially spaced from the opening.

Where there are drive connection means from the closure for opening and closing said at least one aperture, this may conveniently comprise stop means to determine the opened and closed states of said aperture so that the connection means disengage when the stop means come into operation.

According to a further aspect of the invention, there is provided a fluid container comprising an upper outlet provided with external closure means and having metering means comprising a chamber between said closure means and the main volume of the container for dispensing a measured quantity of fluid, said metering means comprising a pair of concentric members providing with said external closure means an enclosed chamber, the members being provided with registrable apertures for placing said chamber in communication with the main interior of the container, one of the members being fixed relative to the container and forming an upwardly projecting pourer opening for the metered quantity of fluid, the closure means being rotatable on the container to and from an operative position and the outer of the members being engageable by the closure means to be turned with its rotary movement so as to locate said openings in registration, thereby to put the aperture in communication with the main interior space of the container when the closure means is operative, and rotation o the closure means from its operative position placing said openings out of registration to isolate the chamber from the main chamber interior and to permit dispensing of the fluid metered by said chamber.

By way of example, embodiments of the invention illustrated in the accompanying drawings will be described in more detail.

BRIEF DESCRIPTION OF THE DRAWINGS

FIGS. 1 and 2 are, respectively, a broken away perspective view and an exploded view of a first form of dispensing means in a container, FIGS. 3 and 4 are an axial section and an exploded view of another form of said dispensing means in a container, FIG. 5 illustrates the dispensing means of FIGS. 3 and 4 in the container and with the container closure removed, FIG. 10 is an exploded view of another form of dispensing means, FIGS. 11 and 11a are axial sectional views of the dispensing means of FIG. 10, the plane of FIG. 11 passing through the beaker ears when the detailed view of FIG. 11a is offset therefrom, FIG. 12 is a detailed illustration of the sleeve locking means of the dispensing means of FIGS. 10 and 11, FIGS. 13 and 14 are axial sectional and exploded views respectively of another form of dispensing means, FIGS. 15 and 16 illustrate the top region of the means of FIGS. 13 and 14 before and after opening, FIG. 17 is an axial sectional view of a still further form of dispensing means, and FIGS. 18 and 19 are a perspective view and a plan view respectively of the dispensing means of FIG. 17.

DESCRIPTION OF THE PREFERRED EMBODIMENTS

Figure 6:
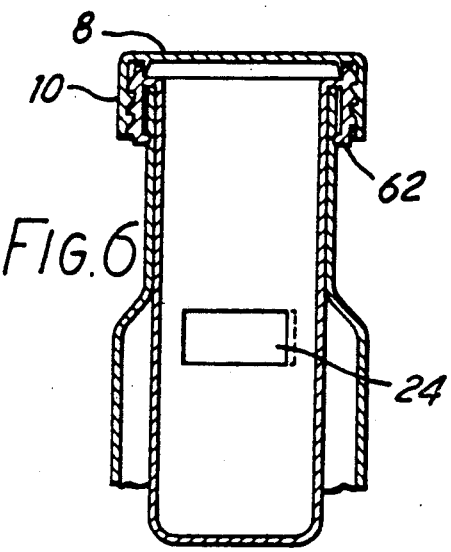
FIGS. 6 and 7 are axial and plan sections, respectively, of a further form of dispensing means in a container.

In the example of FIGS. 1 and 2, a container or bottle 2, which is not illustrated fully, has a circular cross-section neck 4 with an external screw thread 6 for closure cap 8 having a screw-threaded skirt 10. Fitting within the neck in a fluid-tight manner is a conically tapered sleeve 12. A metering receptacle in the form of a beaker 14, having a cylindrical rim 16 that sits on the rm of the bottle 2, fits the inside face of the sleeve 12 closely. The cap, sleeve and beaker are all moulded from resilient plastics material, as are the metering means in all the further examples described later.

The closure cap has an inner cylindrical flange 18 on the outer face of which is a series of small equispaced ribs 20 that are engageable with a similar series of ribs 22 on the inner face of the beaker. By means of the ribs, the beaker can be rotated by the cap as it is screwed on and off the bottle.

The beaker 14 and the sleeve 12 each have a pair of diametrically opposite openings 24, 26 respectively at a level intermediate the height of the beaker. The sleeve has a number of snap ribs 28 by which it is locked into the bottle neck, and a lug 30 depending from its upper lip 32 locating in a slot 34 in the bottle rim to hold the sleeve against rotation. The beaker is rotatable in the sleeve, with a thickened rim 36 on three sides of each aperture a close sliding fit on the inner face of the sleeve. The apertures of the beaker and sleeves are thus relatively displaceable between an open position in which they provide communication between the interior of the beaker and the main internal volume of the bottle, and a closed position in which the apertures are out of register and the main volume is sealed from the beaker interior. A pair of diametrically opposite radial projections 38 are formed on the beaker each on the fourth side of its aperture, not occupied by the rim 36; these projections extend into the apertures 26 of the sleeve, so retaining the beaker axially int he sleeve and also setting end limits for the rotation of the beaker between the open and closed positions.

In use, as the closure cap is screwed onto the bottle the two series of ribs 20, 22 come into engagement and the beaker is rotated to place the openings 24, 26 in registration before the cap has been fully screwed on. The rotation of the beaker is limited by the projections 38, and as the cap continues to be screwed down the two series of ribs are able to ride over each other because of the flexibility of the plastics mouldings. If the bottle is now inverted its contents are then able to flow into the beaker through the apertures formed by the openings while the closure cap seals the bottle outlet. The bottle is then turned upright again and liquid falls from the upper region of the beaker to be held in the lower region below the apertures. It is arranged that the space in the beaker above the apertures is greater than the space below the apertures, so that as the bottle is turned upright there will be more than sufficient liquid in the upper space to fill the lower space and the excess escapes through the apertures. In this way it is ensured that a predetermined quantity is collected in the beaker without any skill or judgement on the part of the user.

At this stage, the cap is unscrewed. The first turning movement also rotates the beaker, through the interengaging ribs 20, 22, and the openings 24, 26 are remove out of register to isolate the interior of the beaker from the main volume of the bottle. When the projections 38 reach the opposite ends of the sleeve openings 26 to hold the beaker against rotation, the series of ribs 20, 22 are then able to ride over each other, as in the reverse movement, in the manner of a slipping clutch. The beaker and sleeve now seal off the neck of the bottle independently of the closure cap. When the cap has been removed, the metered quantity of liquid in the beaker can be dispensed without any risk that liquid from the main volume will escape as the liquid is poured from the beaker. It will be clear that when the cap is screwed on again, the openings 24, 26 are automatically brought into register again, so that the bottle is prepared for dispensing the same quantity of liquid again.

In the example of FIGS. 3 to 5, features already described in the first example are indicated by the same reference numbers. The metering beaker 14 is now fixed in and seals against the inner periphery of the bottle neck, similarly to the sleeve of the first example, by means of the snap ribs 28 and the lug and slot 30, 34. The sleeve 12 fits closely without the beaker and in this example it has the projections 38 at the ends of its openings 26 extending into the diametrically opposite openings 24 in the beaker to provide end stops, in this case for rotation of the sleeve by the screw cap 8. The sleeve may have an integral pouring spout 42 (such a spout can similarly be provided on the beaker of FIGS. 1 and 2) in the outer face of which there is the series of ribs 22 engageable by the ribs 20 on the inner face of the cap. Drain holes 44 are provided in the shoulder 46 of the sleeve, below the spout, for liquid that finds its way between the spout and cap when the bottle is turned upright from an inverted position.

This form of dispenser is used in the same way as the example first illustrated and further description is not necessary. It will be noted that, as in the first example, the space in the beaker above the apertures has a larger volume than that below the apertures so that a predetermined volume of liquid can be consistently metered.

Figure 7:
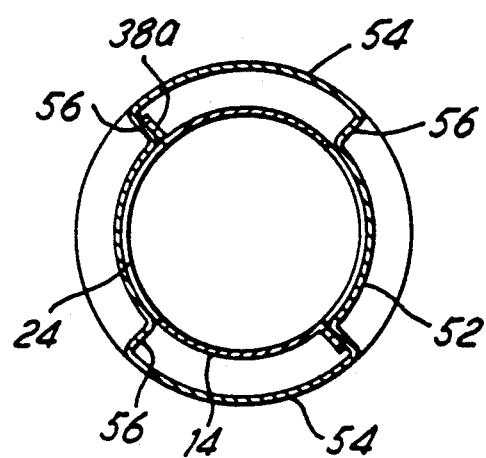
Figure 8:
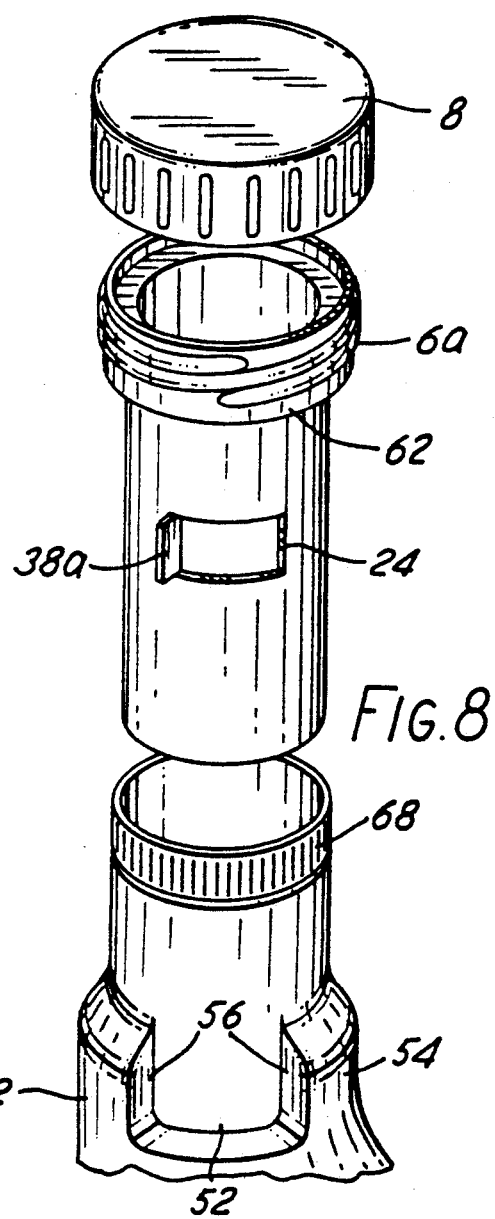
FIG. 8 is an exploded view of this further form of dispensing means.
Figure 9:
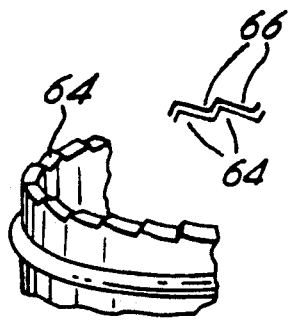
FIG. 9 illustrates a modification of the dispensing means of FIGS. 6–8.

In the example of FIGS. 6 to 9, the bottle 2 itself fulfills the function of the sleeve in the preceding examples. The beaker is provided as before with the pair of diametrically opposed openings 24 dividing its interior into a larger volume upper part and smaller volume lower part. It fits in a sealing manner in the bottle neck and the neck is of such a length that portions of its inner wall form a sliding seal with the outer wall of the beaker to below the level of the openings. As can be seen best in FIG. 7, at the level of the openings the cross-section of the neck comprises a symmetrical arrangement of two pairs of concentric portions 52, 54. The portions 52 at a smaller radius are in close contact with the adjacent wall of the beaker to provide the seal and the portions 54 at a larger radius leave openings for passage of the contents of the main volume of the bottle to the beaker when the openings 24 are registered with them. These portions 52, 54 are joined by radial wall portions 56.

At one end of each opening in the beaker there is a projection 38a, somewhat more prominent than the projections 38 of the previous examples. When mounting the beaker in the bottle, the projections 38a are flexed into the openings 24 as the beaker is forced into the bottle neck, and they spring out again when they reach the larger radius regions 54 so that they can engage the neck portions 56 to act as end stops in the manner already described. At the top of the beaker there is a downturned lip 62 forming an annular recess within which the top rim of the container seats with an interference fit so that the beaker cannot move vertically in the neck. On the outer face of the lip 62 there is a screw thread 6a that is arranged to be a tight fit with the internal screw thread 10 in the closure cap 8. Friction between the cap and the beaker then ensures that, when unscrewing the cap, the beaker will first be turned to the rotational position in which the openings 24 are sealed off before the cap is unscrewed and, when the cap is screwed down again, the openings will be registered together as the cap is rotated in engagement with the beaker screw thread 6a. Additionally or alternatively, as shown in the detailed sketch, series of ratchet teeth 64, 66 can be provided in the top rim of the beaker and the opposite face in the cap interior to ensure rotation of the beaker to open and close the apertures. As a further means of increasing resistance to the rotation of the beaker in the bottle neck, there is a series of fine ribs 68 around the rim of the bottle.

The method of use of this further example will be clear from the previous example and does not therefore need to be re-explained in detail. It may be noted here that in all the examples described, the presence of the dispensing means does not mean that the final quantity of fluid in the bottle is wasted; after the last full dose has been dispensed, because of the position of the openings, it is still possible to recover substantially all the residue by allowing it to drain from the inverted bottle.

Referring now to FIGS. 10 to 12, similarly to earlier examples the neck 2 of the container carries the metering means for the contents of the container, comprising a beaker 80 and a pourer sleeve 82 fitting within the neck, and a closure cap 84 rotably securable onto the outer face of the sleeve.

The beaker 80 fits closely within the sleeve 82 and has a pair of diametrically opposed ears 86 that project through slots 88 in a shouldered region 90 between larger and smaller diameter portions of the lower part of the sleeve. The slots 88 have a greater angular extent than the ears 86 so that the beaker can rotate in the sleeve. The beaker and sleeve each have a pair of diametrically opposite openings 92, 94 respectively, in their side walls which are registered in height when the two mouldings are assembled together. One notable difference from the preceding examples is that the sleeve 82 is shown with slot-like openings 94 extending to its lower edge. The lowermost peripheral portions of the sleeve are held in a circumferential recess 98 formed in the beaker, so that any loss of rigidity due to the open-ended openings 94 in this region of the sleeve does not prevent sealing of the apertures when the openings are turned out of register. The bottom edges of the beaker openings 92 of course need extend no lower than the top of the inner rim of the recess 98. It will be understood that a similar configuration can be provided in the other examples described.

In the rotation permitted by the angular extent of the slots 86, the beaker can be moved through a part of a turn between opposite end positions in one of which its openings 92 are coincident with the sleeve openings 94 and in the other of which the openings 92, 94 are out of register circumferentially so that the path through them is closed.

Integrally moulded into the inner and outer faces of the beaker, above the openings and at a level adjacent the lowermost portion of the closure cap 84, there are sealing rings 102, 104 engaging the opposed faces of the sleeve. These ensure that at no time will fluid be able to flow between the sleeve and beaker above the openings.

Projecting outwards above its openings, the sleeve has spaced annular engagements for the container neck and for the closure cap. The container neck engagement takes the form of a cylindrical flange 108 projecting downwards from the shouldered region 90 of the sleeve and outwardly spaced from the main body of the sleeve. A screw thread 110 on the inner face of the flange engages a corresponding screw thread 112 on the outer face of the container neck. At the bottom of the flange is a series of integral pawl-like projections 114 which, as the sleeve is screwed down, engage complementary projections 116 moulded onto the container. These projections lock the sleeve in place once it has been fully screwed own, sot hat a permanent sealed connection can be achieved between the sleeve and the container. It is also possible to lock the device in place by providing the sleeve with spurs that snap-fit against the inner wall of the container, but a feature of the form of locking shown is that it does not impose any non-uniform radial stress on the sleeve and does not therefore have any influence on the fit between the sleeve and the container.

The closure cap engagement is in the form of a bayonet-type connection. This comprises four identical projections 120 on the outer face of the sleeve above the shouldered flange 108, each consisting of an arcuate wedge portion 122 parallel to the flange and a descending end portion 124, there being a space between each end portion and the adjacent termination of the next arcuate portion. The inner face of the closure cap has four equispaced lugs 126 that drop into the spaces between the projections and are engaged under the wedge portions 122 the cap is turned, to abut against the end portion 124.

The lugs of the cap are formed on the inner face of a bottom skirt 128. Extending upwards form the skirt in the interior of the cap there are four equispaced pockets 130 each of a size to embrace closely three sides of an ear 88 of the beaker. The cap therefore engages the beaker ears as its engagement lugs drop between the projections in any of the different angular starting positions the engagement permits. In the rotational locking movement of the bayonet-type connection, the internal shoulder 132 at the top of the cap skirt is drawn tightly against the top edge of the shouldered region 90 of the sleeve to provide, together with the containment of the beaker ears in the cap pockets 130, a continuous peripheral seal for the container contents.

The sleeve extends above the shouldered portion 90 in a conically tapered pourer spout 136. Between the spout and the portion 90 there is a circumferential channel 138 to hold any fluid that might drip from the spout in use. The purer spout itself comprises an integrally moulded tear-off strip 140 leading from a tab 142 at a chamfered side region 144 opposite to the pourer opening 146 proper. The strip 140 provides a tamper-evident seal that is removed by the user bending the tab 142 downwards and outwards to start tears along the weakened edges of the strip, which can then be removed completely to expose the pourer opening 146.

Within the cap 84, depending from its top face, are four equispaced vanes 148. In the locked-on position of the cap its inner top face bears tightly against the top face of the pourer spout 136 and the vanes 148 bear against the adjacent side face of the spout. Their arrangement is such that one or other of the vanes encloses the chamfered region 144 which, after the removal of the tear-off strip, is in permanent communication with the main volume of the container. The vane 148 enclosing this region seals the cap interior against spillage from the pourer spout, but the vane can be flexed by an increase of gas pressure within the container to release gas that can then escape through an aperture 152 in the top of the cap.

Assembly of the parts described involves inserting the beaker 80 into the sleeve 82 from below until the ears 86 of the beaker snap into position in their associated slots 88 in the sleeve. The beaker is then held axially in the sleeve and is capable of limited rotation relative to the sleeve to put the openings 92, 94 into and out of register with each other. The closure cap can be secured to the sleeve by the bayonet-type connection before or after the beaker has been inserted. The location of the beaker ears in the cap pockets and the end stops of the bayonet-type connection ensures the appropriate location of the parts angularly relative to each other. When the container has been filled the three-part assembly can then be simply screwed into place on the container neck until it is firmly locked in place by the pawl-like elements 114, 116. In doing this, the sealing of the container contents, i.e. the seal between the cap 84 and the sleeve shouldered region 90 and beaker ears 86, will have been automatically secured. At whatever stage of the assembly the closure cap has been added, its location in the secured position also ensures that the openings 92, 94 are in coincidence with each other. The interior space of the beaker and sleeve then forms a metering chamber completely sealed from the outside but in communication with the main volume of the container through the openings. The volume of the space above the openings is greater than that below the openings, as in the examples previously illustrated, and the method of use for dispensing metered quantities of fluid is the same as in those examples.

An advantage of the construction described above is that only a quarter-turn is needed for opening and closing: as will be understood from the preceding description, the closure cap can in fact be put on in any of four positions. It will be noted, moreover that opening and closing the metering chamber apertures is achieved by positive drive with no need for a slipping engagement to allow parts to overrun each other; less physical effort is required and the construction is therefore more easily used, e.g. by the elderly.

One feature of the illustrated construction is that, when the cap has been removed the only moving parts visible are the ears 86 of the beaker: there is therefore little risk that the rotational position of the beaker will be disturbed when the cap is off. Nevertheless, if the height of the ears is greater than the height of the lugs 126 on the cap they will be engaged before the cap lugs can drop into the gaps between the projections 120 on the sleeve: if the position of the beaker has been tampered with, as the user turns the cap the beaker will be returned substantially to its correct position before the bayonet-type connection can be engaged. It is also possible to provide the inner face of the cap, between the pockets, with closely spaced projections, e.g. ribs. The cap cannot then be dropped home onto the container unless the ears 86 are aligned with the gaps between the projections 120 so that the user is warned if the mechanism has been tampered with.

The embodiment illustrated in FIGS. 13 to 16 has many of the features of the last-described embodiment and corresponding parts are indicated by the same reference numbers.

Beaker 160 is secured to a sleeve 162 in the same manner as the last-described embodiment and the same form of locking screw engagement is provided between the sleeve and the container body. The closure cap 164 is likewise located relative to the beaker by engagement between the beaker ears 86 and the sealing pockets 130 of the cap. The engagement between the cap and the sleeve differs, however, because the cap is held captive although rotatable on the sleeve. The engagement comprises a locking ring 166 on the sleeve above its engagement elements 110, 114 for the container and a complementary recess 168 within the skirt 170 of the cap. The two parts as reassembled together under by axial pressure, simply forcing the bottom flange 172 of the cap recess under the locking ring 166. Chamfers on the top face of the ring 166 and the bottom face of the flange 172 reduce the forces and deformations required to obtain a permanent locking fit.

Sleeve spout 174 has an offset pourer opening 176 on its top face and a diametrically opposed vent hole 178. Both are closed initially by a tamper-evident seal 180 on the cap. Similarly to the sleeve seal of the last-described embodiment, this comprises a tab 182 to start the tearing of the seal strip and the strip extends to a larger portion 184 which covers the cap pourer opening and which is bounded by an integral pouring lip 186 projecting from the top face of the cap.

In the manner already described, the beaker, sleeve and cap can be assembled together before being mounted on the filled container body and secured by the locking screw engagement. In use, the openings are brought into and out of register by rotating the cap, its range of movement being limited, of course, by the extent of the slots through which the beaker project. The same arrangement of unequal volumes in the chamber above and below the openings is provided for metering, as already described. As will be understood from the preceding examples, the pourer openings in the top faces of the sleeve and cap are closed off when the metering openings are in register and vice versa. When the sleeve pourer opening is closed off, the gas pressure in the container acts on the top wall of the closure cap. If excess pressure occurs, it can deform the cap top wall sufficiently to relieve the pressure through the otherwise closed opening in the top of the cap.

As in the preceding example, the positions of the operative pouring openings relative to the container is fixed because the sleeve is fixed in position. Another preferred feature of the invention, also illustrated in the preceding example, is the positioning of the pourer opening mid-way angularly between the diametrically opposed openings 94 of the sleeve. The container will usually be inverted by tipping it instinctively in the same direction as for pouring and with the openings 92, 94 disposed transversely to the tipping direction a more uniform metering can result.

In the final example of FIGS. 17 to 19 there is a fluid container that can be used to dispense its contents in predetermined quantities or as an unmetered flow. Like preceding examples, the metering mechanism comprises a beaker 200 and sleeve 202 with openings 204, 206 respectively that can be brought into and out of register by rotation between the beaker and the sleeve. The internal space above the openings is greater than that below the openings. The beaker, which here surrounds the sleeve, is fixed to the container neck 208 by a locking screw engagement of the same form as that provided on the sleeve of the last two examples. The sleeve has integrally moulded sealing rings 210 engaging the inner face of the beaker above the openings and also moulded on the sleeve outer face are snap-engagement elements 212, 212a that fix it axially to the beaker.

The container closure cap 214 is moulded with the sleeve 202 to which it is connected by an integral hinge 216, although it can also be a separate member permanently attached to but rotatable on the sleeve in the manner of the last-described embodiment.

Markings 218, 220 visible on the exterior of the fixed beaker moulding indicate "continuous" and "dose" positions to which an aligning mark 222 on the sleeve can be turned. When the sleeve is in the "continuous" position the sleeve and beaker openings are aligned and, with the cap closed, a predetermined quantity of the container contents can be captured in the beaker by inversion and return of the container as already described. Turning the sleeve 202 to the "dose" position closes the aperture and the measured quantity can be dispensed when the closure is opened. If the sleeve is left in the "continuous" position the contents can be poured in any unmeasured quantity from the container.

For ease of moulding, the sleeves and the beakers of the illustrated examples have some degree of conical taper. It can further simplify the moulding of these parts if the taper is made more prominent over the height of their openings so that these can be formed without requiring additional moulding cores. It will be understood more generally, without further illustration, that many of the features particularly described with reference to the individual examples illustrated can be adopted in others of the examples and further illustration of such combinations of features is therefore unnecessary. For example, the rotatable top closures can in each case be arranged to have a spiral or screw-like movement and can be arranged to have rotary movement limited to a part of a turn.

Although the illustrated examples have been described with reference to the dispensing of liquids, it will be understood that fine particulates can also be considered as fluids and can similarly be dispensed in metered quantities by the use of the present invention.

I claim:

1. A fluid container comprising a main internal volume for the contents of the container and metering means for dispensing a measured quantity of fluid from said main volume, the container having an upper outlet for the metered fluid and external closure means for said upper outlet, said metering means comprising a pair of concentric members providing with said external closure means an enclosed chamber, openings being provided on the members, said openings being registrable to form an aperture placing said chamber in communication with the main volume of the container, one of the members being fixed relative to the container and forming an upwardly projecting pourer opening for the metered quantity of fluid, rotary mounting means for the closure means permit rotation of the closure means on the container to and from an operative position, the outer of said concentric members having engagement means for rotation by closure means in its rotary movement whereby to locate said openings in registration and thereby to put the aperture in communication with the main interior space of the container when the closure means is operative, and rotation of the closure means from its operative position placing said openings out of registration to isolate the chamber from the main chamber interior and to permit dispensing of the fluid metered by said chamber.

2. A fluid container comprising an upper outlet, a main internal volume for the contents of the container and metering means between said main volume and the upper outlet for dispensing a measured quantity of fluid from said main volume through said upper outlet, external closure means for said upper outlet, the metering means comprising a chamber, the chamber being provided with at least one aperture for communication between the chamber interior and the main volume of the container, manually operable rotary means for opening and closing the aperture, said aperture being disposed intermediate the height of the chamber, upper and lower receiving spaces being defined thereby within the chamber that are respectively above and below said aperture, said metering means comprising a sleeve and a receptacle concentric with the sleeve, respective for forming said aperture openings in the sleeve and receptacle, relative rotation between the sleeve and receptacle bringing their respective openings to and from a position of registration in which the openings form said aperture giving communication between said chamber and the container main volume, whereby inversion of the container with the aperture open and the closure means closed fills the upper space with the container contents and return of the container to the upright position allows the contents of the upper space to fall into and fill the lower space, whereafter, by reverse rotation of said rotary means the aperture is closed to isolate said main volume from the chamber and permit the metered contents of the lower space to be dispensed.

3. A container according to claim 2 wherein the closure means is provided by a top closure and forms said manually operable means for opening and closing said at least one aperture, means of said top closure for entraining one of said sleeve or said receptacle for said opening and closing for metered dispensing of the container contents.

4. A container according to claim 2 wherein respective engagement means secure both the receptacle and the top closure means to the sleeve to form a sub-assembly therewith, and further engagement means secure the sleeve to the container.

5. A container according to claim 2 wherein the external closure means comprises means for permanent attachment to the container and an opening is provided on said closure means that is brought into and out of registration with said upper outlet by rotation of the closure means, whereby the outlet is closed when said metering chamber aperture is opened and vice versa.

6. A container according to claim 2 comprising venting means for the release of excess gas pressure within the container.

7. A container according to claim 2 wherein a venting aperture is provided for the container contents and the closure means comprises a portion that seats against said venting aperture and that is deformable by an internal over-pressure within the container to permit the escape of excess gas.

8. A container according to claim 2 wherein a pouring spout is provided on said upper outlet and a drip-retaining recess is located below and externally of the upper outlet and internally of the external closure means.

9. A container according to claim 2 wherein the external closure means is removable from the container to expose a portion of the metering means, said exposed portion being substantially wholly non-rotatably fixed to the container.

10. A container according to claim 2 wherein non-releasable locking means are provided for the closure means to lock said closure means onto the container and said closure means provides at least a part of said outlet opening.

11. A container according to claim 2 wherein the metering means have a position of adjustment permitting continuous unmetered dispensing of the container contents.

12. The fluid container according to claim 2 wherein the volume of the chamber upper receiving space is greater than the volume of the lower receiving space.

13. A container according to claim 2 wherein the closure means said metering means comprising forms said manually operable rotary means for opening and closing said at least one aperture.

14. A container according to claim 13 wherein rotation restriction means are provided in said metering means to restrict the rotation of the closure means to less than one full turn.

15. A container according to claim 13 wherein the upper outlet is offset from an axis of rotation of the closure means and said at least one aperture is also offset therefrom in a direction transverse to the direction of offset of said outlet.

16. A container according to claim 3 wherein the external closure means is rotatable with a spiral or screw motion.

17. The container recording to claim 13, wherein a pourer opening disposed in a first position on the container provides said upper outlet.

18. The container according to claim 17, wherein the sleeve is fixed non-rotatably to the container, said outlet of the container being provided by said sleeve, the closure means comprising means for rotation of the receptacle to bring said sleeve and receptacle openings into and out of registration.

19. A container according to claim 17 wherein said sleeve and pourer are integrally formed and engagement means are provided between the sleeve and receptacle for locating the receptacle concentrically to the sleeve in a manner that is axially fixed but rotatable to a limited extent.

* * * * *